(12) United States Patent
Chen

(10) Patent No.: US 12,545,182 B2
(45) Date of Patent: Feb. 10, 2026

(54) TOWING MIRROR AND MIRROR FRAME ASSEMBLY THEREOF

(71) Applicant: KEN SEAN INDUSTRIES CO., LTD., Chang-Hua (TW)

(72) Inventor: Sheng-Hung Chen, Changhua County (TW)

(73) Assignee: KEN SEAN INDUSTRIES CO., LTD., Chang-Hua (TW)

( * ) Notice: Subject to any disclaimer, the term of this patent is extended or adjusted under 35 U.S.C. 154(b) by 25 days.

(21) Appl. No.: 18/822,727

(22) Filed: Sep. 3, 2024

(65) Prior Publication Data

US 2025/0296503 A1 Sep. 25, 2025

(30) Foreign Application Priority Data

Mar. 21, 2024 (TW) .................................. 113202821

(51) Int. Cl.
*B60R 1/06* (2006.01)
*B60R 1/078* (2006.01)
*B60R 1/12* (2006.01)

(52) U.S. Cl.
CPC ................ *B60R 1/078* (2013.01); *B60R 1/12* (2013.01)

(58) Field of Classification Search
CPC .............. B60R 1/078; B60R 1/12; B60R 1/06
See application file for complete search history.

(56) References Cited

U.S. PATENT DOCUMENTS

| | | | |
|---|---|---|---|
| 6,340,231 B1* | 1/2002 | Polzer | B60R 1/074 359/872 |
| 11,242,006 B2* | 2/2022 | Rothschild | B60R 1/06 |
| 2017/0217374 A1* | 8/2017 | Dziurda | B60R 1/06 |
| 2024/0311415 A1* | 9/2024 | Suzuki | G06F 16/383 |

* cited by examiner

*Primary Examiner* — Amy J. Sterling

(57) ABSTRACT

A mirror frame assembly is adapted to be mounted to a vehicle rearview mirror that includes an outer casing and a mirror, and includes a mirror frame and a removable mounting plate. The mirror frame is adapted to be removably mounted to the outer casing, and includes an engaging member and a pivot connecting portion. The removable mounting plate is connected removably to the pivot connecting portion, is adapted to be engaged with the outer casing, and has a pivot portion and an engaging portion. The removable mounting plate is pivotable relative to the mirror frame between a fixed state and an unfastened state. A towing mirror is adapted to be mounted at a vehicle rearview mirror, and includes the mirror frame assembly and an auxiliary mirror.

9 Claims, 9 Drawing Sheets

TOWING MIRROR AND MIRROR FRAME ASSEMBLY THEREOF

CROSS-REFERENCE TO RELATED APPLICATION

This application claims priority to Taiwanese Utility Model Patent Application No. 113202821, filed on Mar. 21, 2024, the entire disclosure of which is incorporated by reference herein.

FIELD

The disclosure relates to a vehicle accessory, and more particularly to a towing mirror and a mirror frame assembly thereof.

BACKGROUND

A towing mirror is an expansion device mounted to a rearview mirror of a vehicle to expand a field of view of the rearview mirror for a driver, thereby enhancing driving safety.

For example, a fastening apparatus adapted for an auxiliary rearview mirror as disclosed in Taiwanese Invention Patent No. TWI256358B includes a fastening body and two strap bodies for fastening the auxiliary rearview mirror and a support frame to a vehicle rearview mirror via a fastening seat. The auxiliary rearview mirror serves to expand the field of view. However, manufacturing of the fastening apparatus is more complicated, and ratchet teeth need to be disposed on the strap bodies for the strap bodies to engage the fastening body, thereby complicating the structure.

SUMMARY

Therefore, an object of the disclosure is to provide a mirror frame assembly and a towing mirror that can alleviate at least one of the drawbacks of the prior art.

According to a first aspect of the disclosure, the mirror frame assembly is adapted to be mounted to a vehicle rearview mirror. The vehicle rearview mirror includes an outer casing and a mirror that is fixed in the outer casing. The outer casing has an end edge. The mirror frame assembly includes a mirror frame and a removable mounting plate.

The mirror frame is adapted to be removably mounted to the outer casing of the vehicle rearview mirror, and includes at least one engaging member for engaging the outer casing of the vehicle rearview mirror, and a pivot connecting portion.

The removable mounting plate is connected removably to the pivot connecting portion of the mirror frame and is adapted to be engaged with the outer casing of the vehicle rearview mirror. The removable mounting plate has a pivot portion that is connected pivotally to the pivot connecting portion, and an engaging portion that is configured to engage the outer casing of the vehicle rearview mirror. The removable mounting plate is pivotable relative to the mirror frame between a fixed state and an unfastened state. In the fixed state, the engaging portion engages the end edge of the outer casing. In the unfastened state, the engaging portion is distal from the end edge of the outer casing, and the removable mounting plate is rotatable relative to the mirror frame.

According to a second aspect of the disclosure, a towing mirror is adapted to be mounted at a vehicle rearview mirror. The towing mirror includes the mirror frame assembly as described in the first aspect of the disclosure, and an auxiliary mirror mounted to the mirror frame of the mirror frame assembly and being adjacent to the vehicle rearview mirror.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
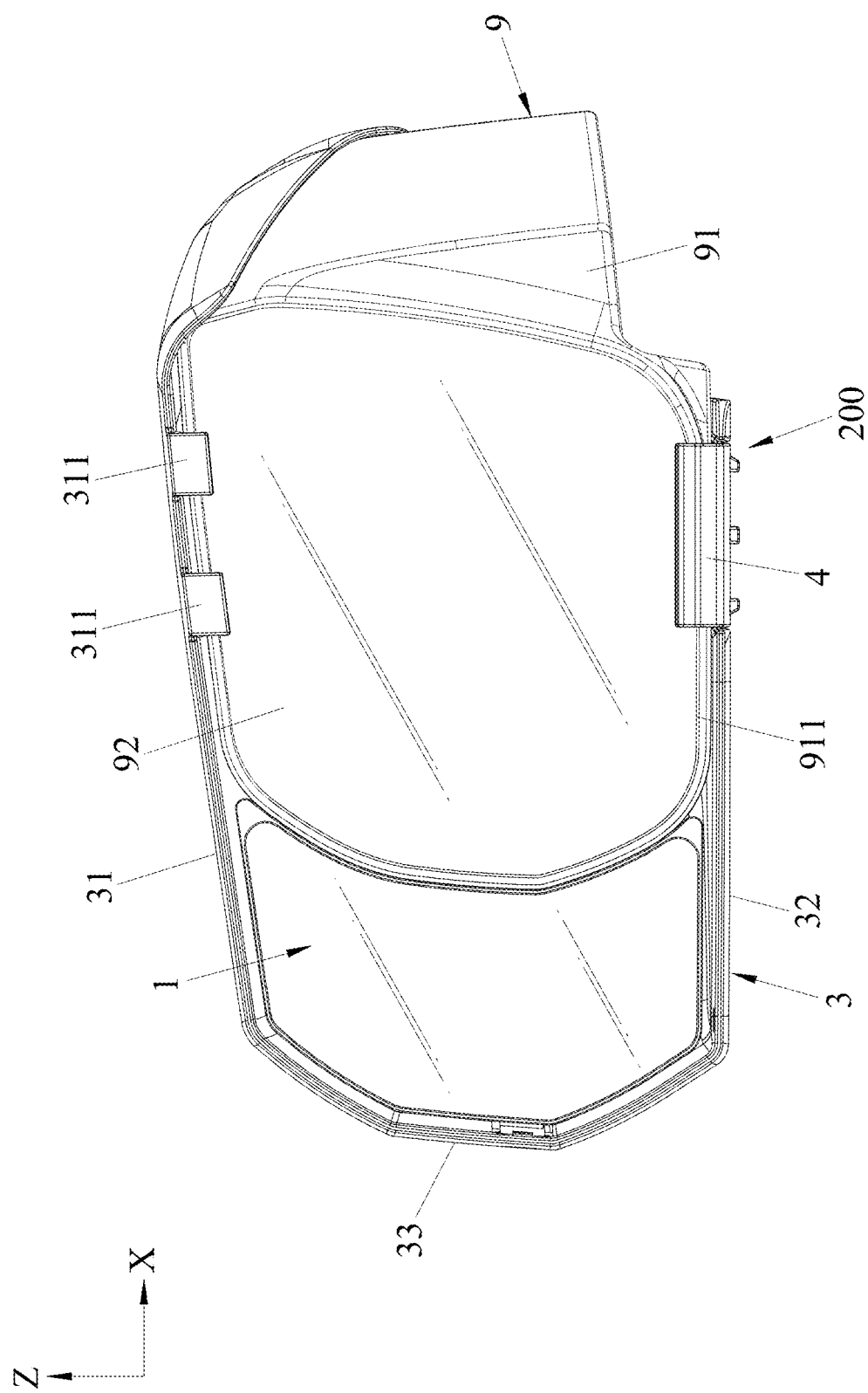
FIG. 1 is a perspective view illustrating an embodiment of a towing mirror according to the disclosure being mounted to a vehicle rearview mirror.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
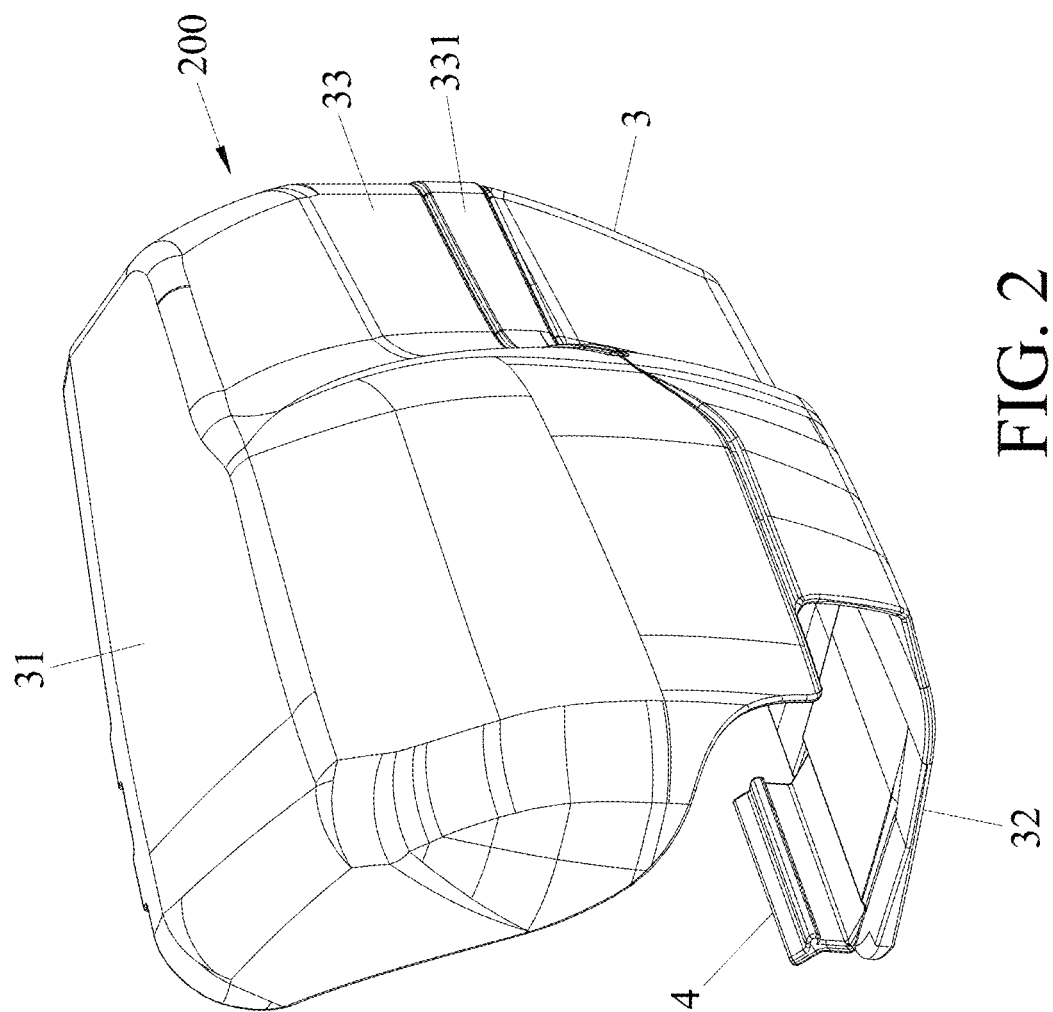
FIG. 2 is a perspective view illustrating an embodiment of a mirror frame assembly according to the disclosure.
Figure 2:
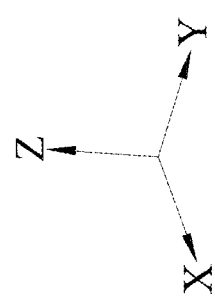
Figure 3:
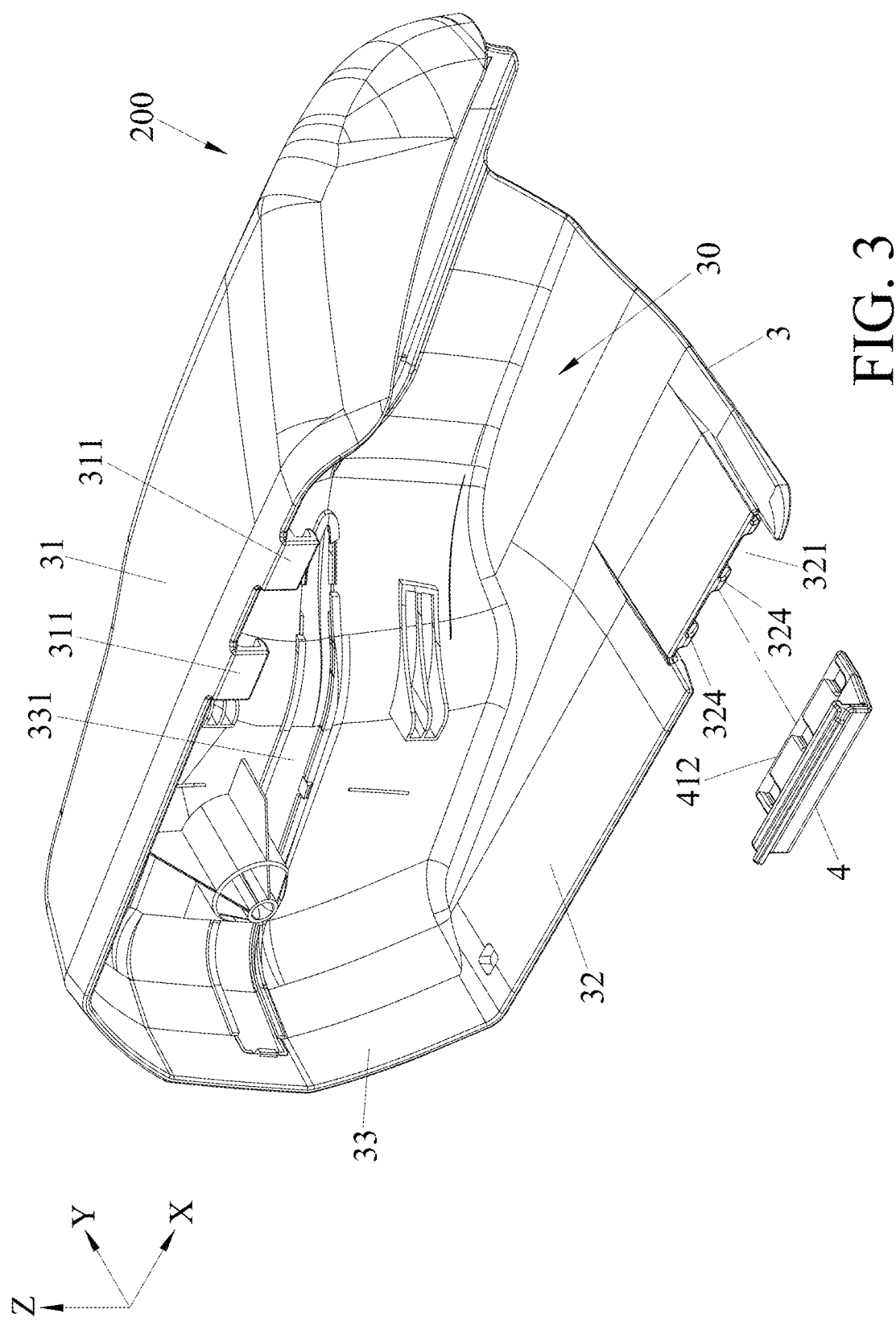
FIG. 3 is an exploded perspective view of the mirror frame assembly.

Referring to FIGS. 1 to 3, an embodiment of a towing mirror according to the present disclosure is mounted to a vehicle rearview mirror 9. The vehicle rearview mirror 9 includes an outer casing 91, and a mirror 92 that is fixed in the outer casing 91. The outer casing 91 has an end edge 911 that projects from the mirror 92. The towing mirror includes a mirror frame assembly 200, and an auxiliary mirror 1 that is mounted to the mirror frame assembly 200 and that is adjacent to the vehicle rearview mirror 9.

The mirror frame assembly 200 includes a mirror frame 3 and a removable mounting plate 4. The mirror frame 3 is adapted to be removably mounted to the outer housing 91 of the vehicle rearview mirror 9. The mirror frame 3 is made of plastic, and includes a first wall 31, a second wall 32 that is opposite to the first wall 31 in a top-bottom direction (Z), and a sidewall 33 that interconnects the first wall 31 and the second wall 32. The first wall 31, the second wall 32, and the sidewall 33 surround and define a cavity 30 for receiving the vehicle rearview mirror 9. The first wall 31 includes at least one engaging member 311 for engaging a top side of the outer housing 91 of the vehicle rearview mirror 9. In this embodiment, the first wall 31 includes two engaging members 311 that are spaced apart from each other in a left-right direction (X) perpendicular to the top-bottom direction (Z). The sidewall 33 has a light-transmitting portion 331 through which light of a turn signal of the vehicle rearview mirror 9 may pass. In some embodiments where the vehicle rearview mirror 9 is designed with no turn signal, the light-transmitting portion 331 may be omitted from the sidewall 33.

Figure 4:
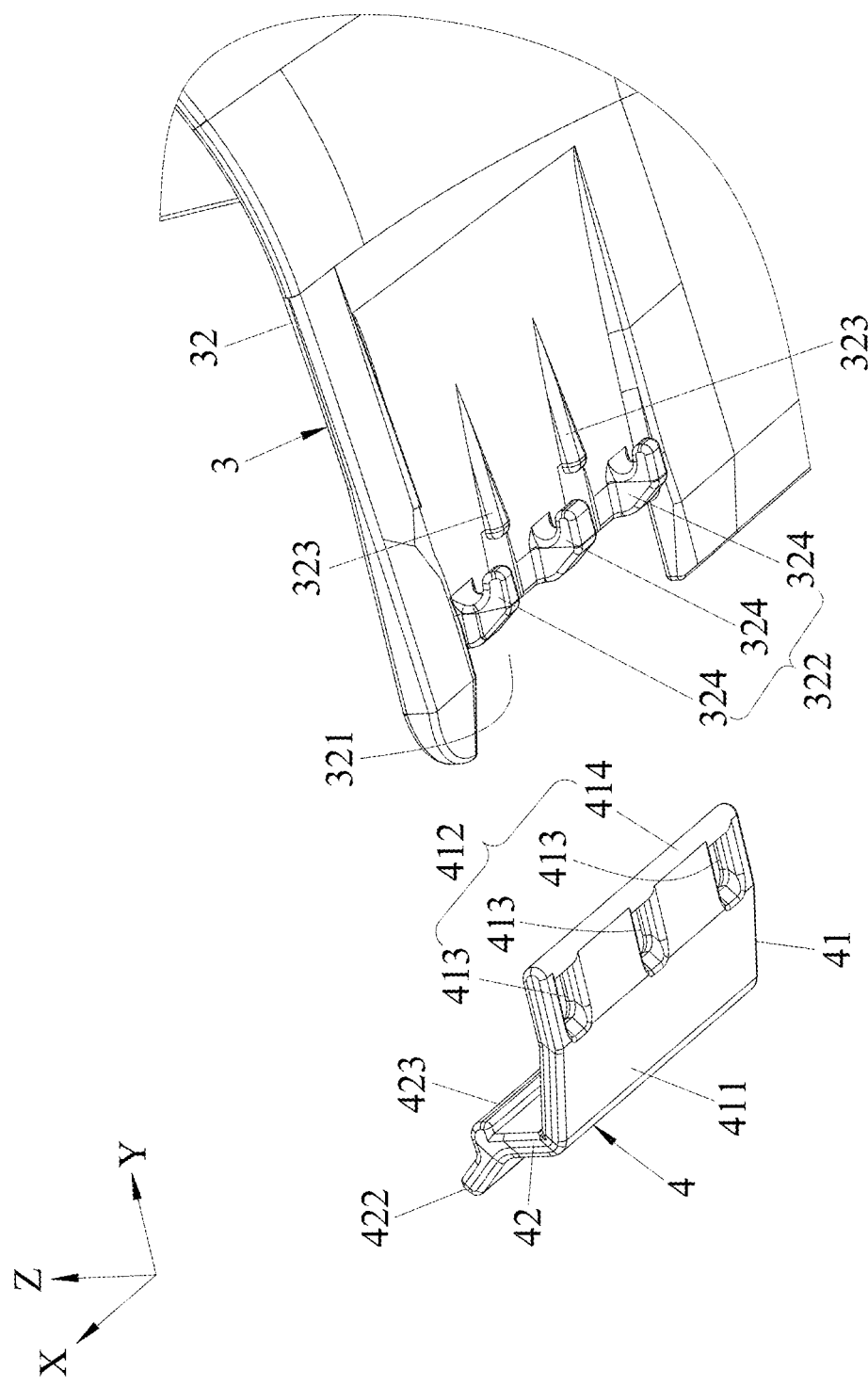
FIG. 4 is a fragmentary exploded perspective view of the mirror frame assembly.
Figure 5:
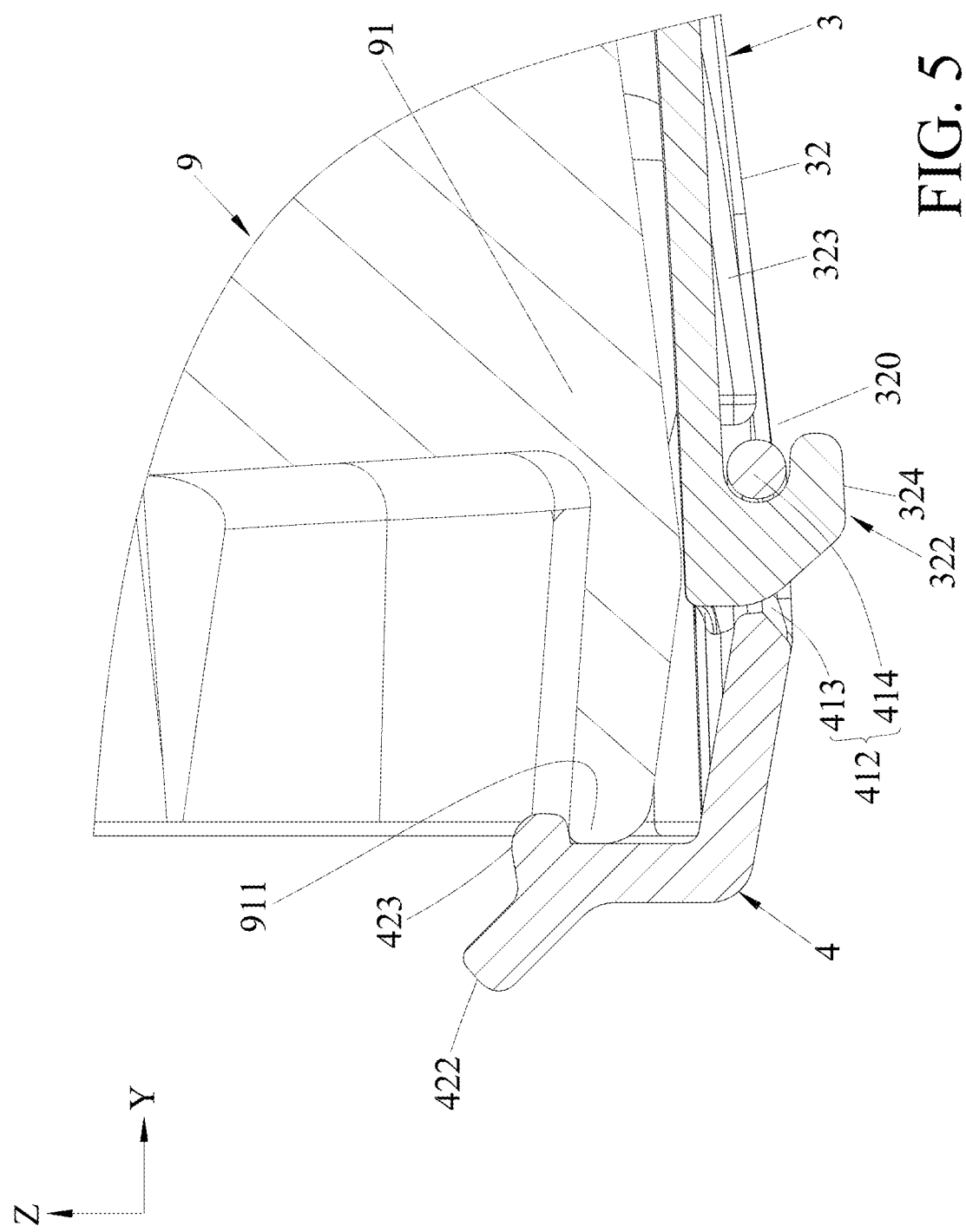
FIG. 5 is a fragmentary sectional view of the mirror frame assembly being mounted to the vehicle rearview mirror, illustrating a removable mounting plate of the mirror frame assembly in a fixed state relative to a mirror frame.

Referring to FIGS. 3 to 5, the second wall 32 includes a recess 321 that opens at a side of the second wall 32, a pivot connecting portion 322 that is adjacent to the recess 321, and at least one rib 323 that is proximate to the pivot connecting portion 322. In this embodiment, the second wall 32 includes two of the ribs 323. In other embodiments, the recess 321 may be omitted from the second wall 32, and the number of the rib 323 may be one, three, or more than four.

Figure 6:
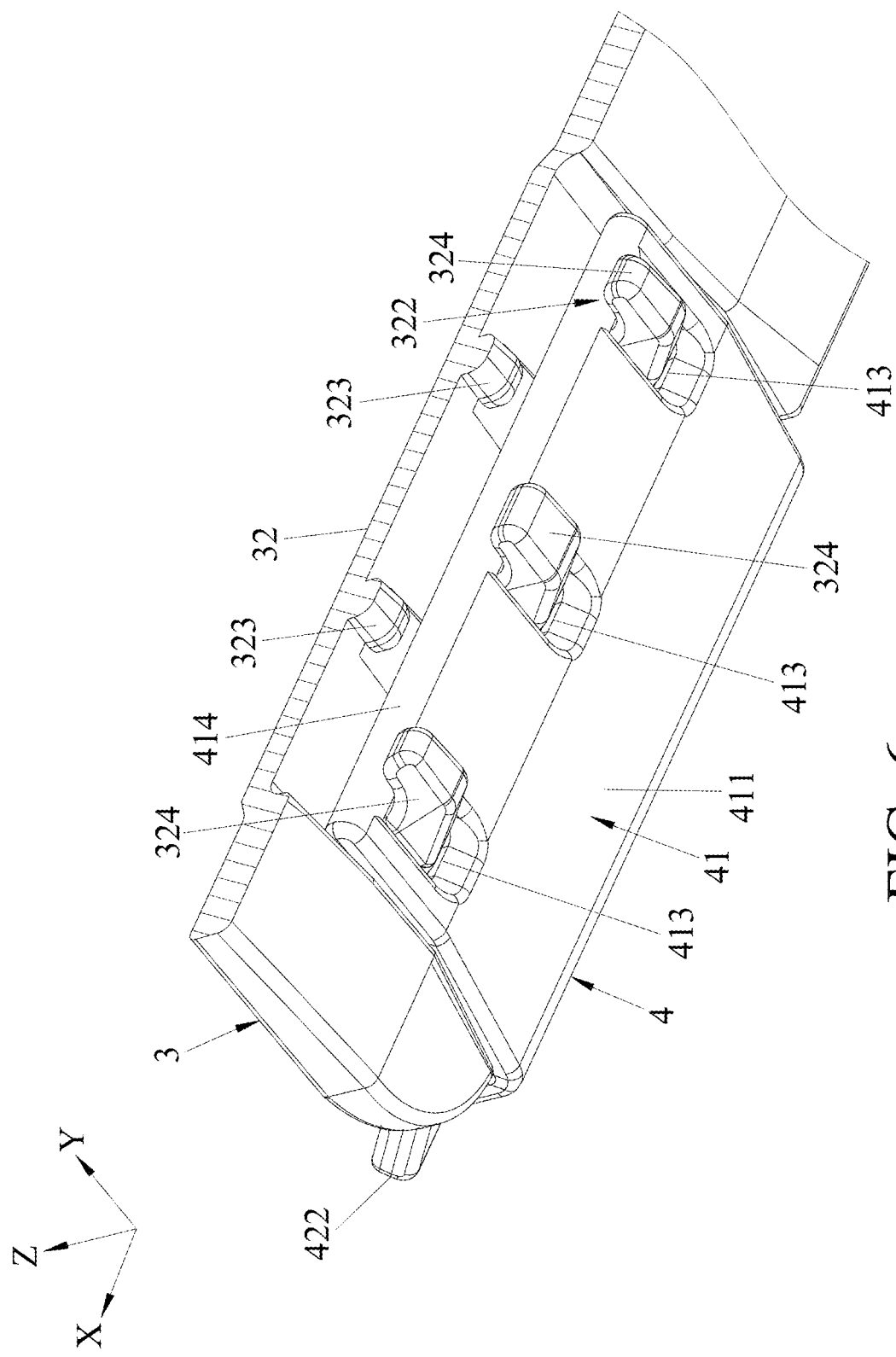
FIG. 6 is a fragmentary perspective view of the mirror frame assembly.

Referring to FIGS. 4 to 6, in this embodiment, the pivot connecting portion 322 includes a plurality of hook members 324 that are spaced apart from each other in the left-right direction (X). Each of the hook members 324 extends in a first direction (Y) that is perpendicular to the top-bottom direction (Z) and the left-right direction (X), and away from the recess 321. The hook members 324 are generally L-shaped. The ribs 323 and the pivot connecting portion 322 cooperatively define a constraining passage 320 therebetween that is expandable. Since the mirror frame 3 is made of plastic, the hook members 324 may be pushed and resiliently deformed, so the constraining passage 320 may be expanded.

Figure 7:
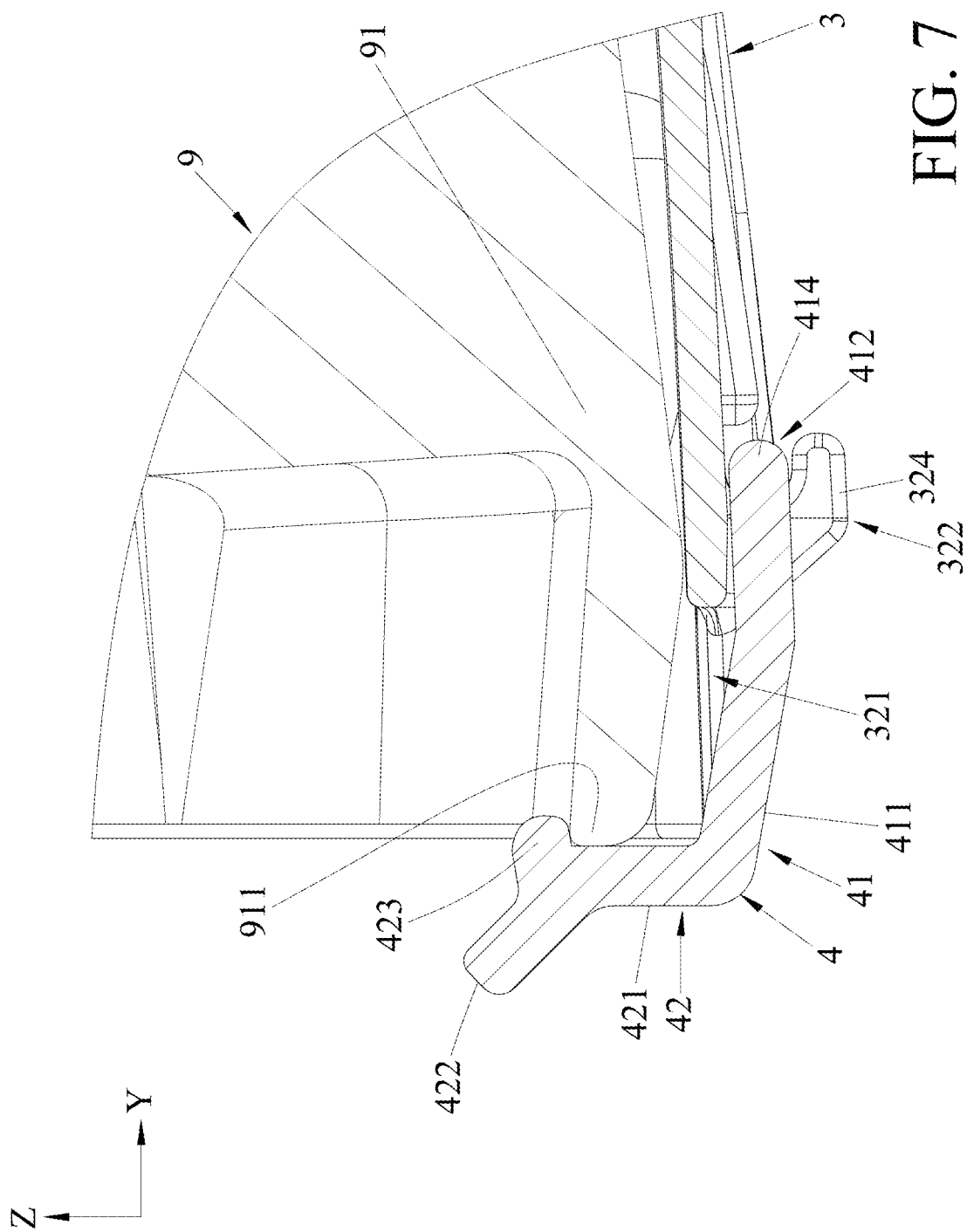
FIG. 7 is a fragmentary sectional view similar to FIG. 5 but obtained from a different cutting plane, illustrating the removable mounting plate in the fixed state relative to the mirror frame.

Referring to FIGS. 4, 6, and 7, the removable mounting plate 4 is configured to be removably and pivotally connected to the pivot connecting portion 322 of the mirror frame 3, and is adapted to be engaged with the outer housing 91 of the vehicle rearview mirror 9. The removable mounting plate 4 includes a first plate body 41 that extends in the first direction (Y) and that is mounted to the mirror frame 3, and a second plate body 42 that extends from the first plate body 41 in the top-bottom direction (Z). The first plate body 41 has an extension portion 411 that is connected to the second plate body 42 and that is mounted to the recess 321, and a pivot portion 412 that extends from the extension portion 411 in the first direction (Y) and away from the second plate body 42. The pivot portion 412 is connected pivotally to the pivot connecting portion 322 of the mirror frame 3. In this embodiment, the pivot portion 412 includes a plurality of notches 413 that are spaced apart from each other in the left-right direction (X) and that permit the hook members 324 to respectively extend therethrough, and a pivot rod 414 that extends in the left-right direction (X), and that is connected to opening sides of the notches 413. The pivot rod 414 permits the hook members 324 to be connected pivotally thereto, thereby allowing the removable mounting plate 4 to be rotatably disposed on the mirror frame 3. Designs of the pivot connecting portion 322 and the pivot portion 412 may vary, for example, one of the pivot connecting portion 322 and the pivot portion 412 may include rivets, screw nuts, or positioning pins, and the other one of the pivot connecting portion 322 and the pivot portion 412 may include pivot lugs, circular holes, or curved fasteners, as long as the pivot connecting portion 322 and the pivot portion 412 are relatively rotatable.

In this embodiment, a cross-section of the second plate body 42 is, for example, but not limited to, a Y-shape. The second plate body 42 has a connection portion 421 that is connected to the first plate body 41, and a pulling portion 422 that extends from one end of the connection portion 421 in a direction away from the mirror frame 3, and an engaging portion 423 that is connected to the pulling portion 422 and the connection portion 421 and that extends toward the pivot portion 412. In some embodiments, the pulling portion 422 may be constructed in other shapes or structures as long as the pulling portion 422 may serve as a force application point to allow a user to clip on or detach the removable mounting plate 4. The engaging portion 423 is configured to engage the end edge 911 of the outer casing 91 of the vehicle rearview mirror 9.

Figure 8:
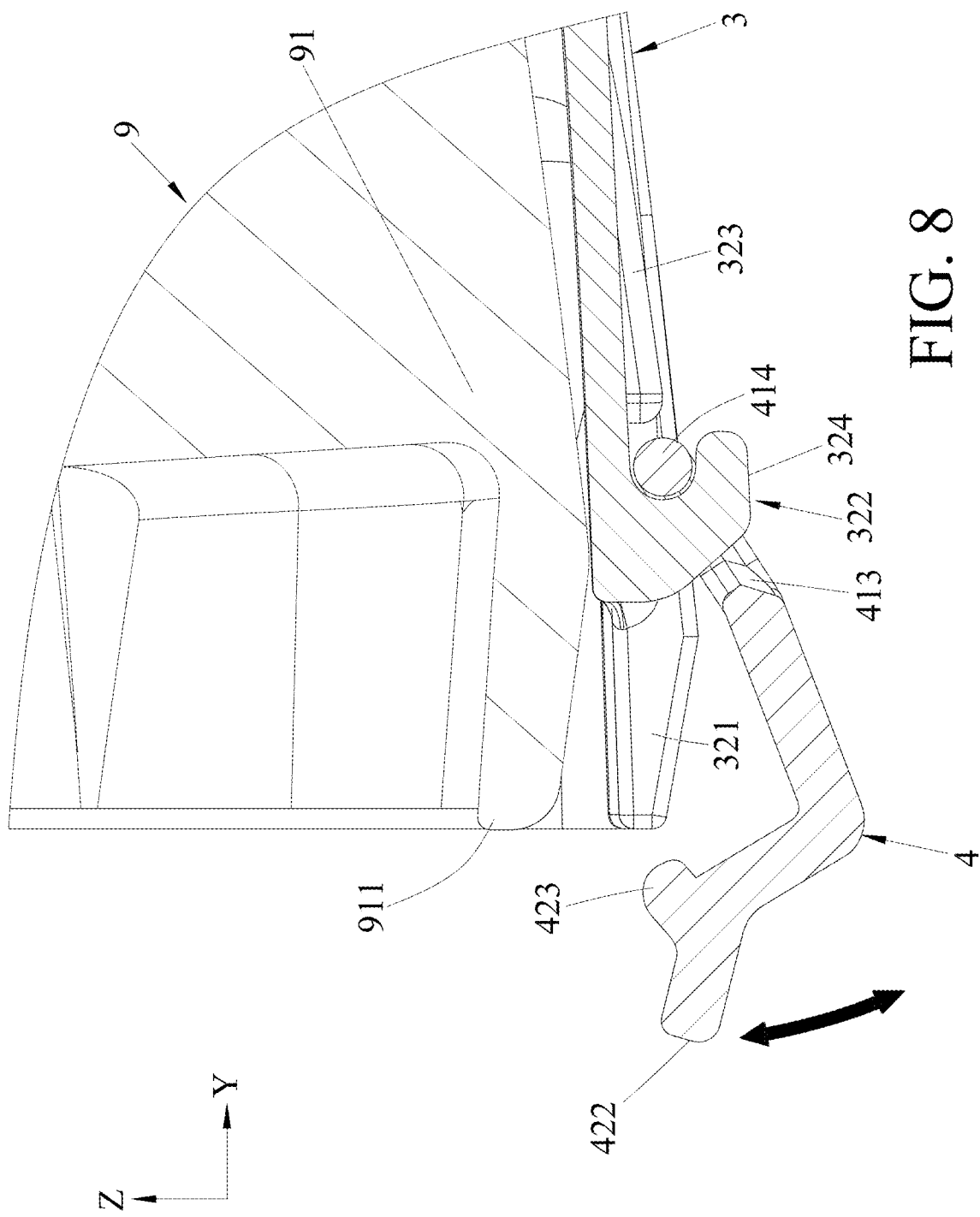
FIG. 8 is a view similar to FIG. 5, but illustrating the removable mounting plate in an unfastened state relative to the mirror frame.

Referring to FIGS. 5 and 8, the removable mounting plate 4 is pivotable relative to the mirror frame 3 between a fixed state (see FIG. 5) and an unfastened state (see FIG. 8). Referring to FIG. 5, in the fixed state, the engaging portion 423 engages the end edge 911 of the outer casing 91. Referring particularly to FIG. 8, in the unfastened state, the engaging portion 423 is distal from the end edge 911 of the outer casing 91, and the removable mounting plate 4 is rotatable relative to the mirror frame 3.

Figure 9:
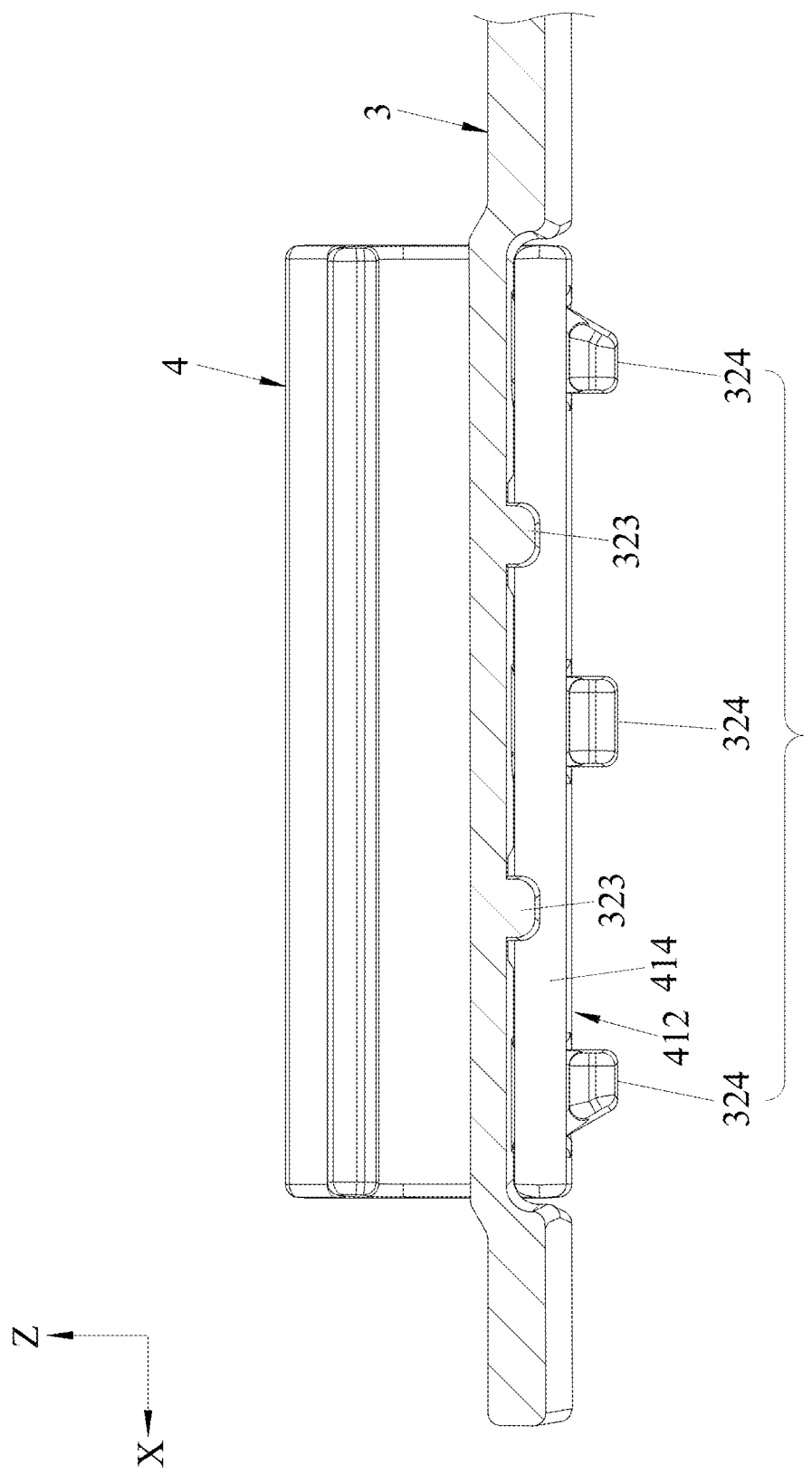
FIG. 9 is a side view of FIG. 6.

As shown in FIG. 9, when the removable mounting plate 4 is in the fixed state relative to the mirror frame 3, the pivot rod 414 of the pivot portion 412 of the removable mounting plate 4 is blocked by the ribs 323 of the mirror frame 3 from falling out.

A variety of mounting methods may be employed to mount the mirror frame assembly 200 of this disclosure to the vehicle rearview mirror 9. For example, the user may first cover the outer casing 91 of the vehicle rearview mirror 9 with the mirror frame 3, and the engaging members 311 are engaged with the top side of the outer housing 91 of the vehicle rearview mirror 9. Next, the user may connect the pivot portion 412 of the removable mounting plate 4 to the pivot connecting portion 322 of the mirror frame 3. At this time, the pivot connecting portion 322 is deformed when being subjected to a pushing force from the pivot portion 412 so the constraining passage 320 is expanded. After the pivot portion 412 of the removable mounting plate 4 passes through the constraining passage 320 and is pivotally connected to the pivot connecting portion 322, the constraining passage 320 returns to its original shape. At this time, the removable mounting plate 4 is in the unfastened state. Next, the user may rotate the removable mounting plate 4 to the fixed state, so that the engaging portion 423 is engaged with the end edge 911 of the outer housing 91, thereby mounting the mirror frame assembly 200 to the vehicle rearview mirror 9. The mirror frame assembly 200 may also be mounted to the vehicle rearview mirror 9 by first connecting the pivot portion 412 of the removable mounting plate 4 to the pivot connecting portion 322 of the mirror frame 3, and the removable mounting plate 4 is currently in the unfastened state. Next, the user may cover the outer housing 91 of the vehicle rearview mirror 9 with the mirror frame 3, and engage the engaging members 311 and the engaging portion 423 respectively with the top side and the end edge 911 of the vehicle rearview mirror 9.

To remove the mirror frame assembly 200 of this disclosure from the vehicle rearview mirror 9, the user may apply a force to the pulling portion 422 so as to rotate the removable mounting plate 4 relative to the mirror frame 3 to the unfastened state. At this time, the engaging portion 423 is disengaged from the end edge 911, and the mirror frame assembly 200 may be removed from the vehicle rearview mirror 9.

In summary, by virtue of the pivot connecting portion 322 of the mirror frame 3 and the pivot portion 412 of the removable mounting plate 4 cooperating with each other, the removable mounting plate 4 may be rotated relative to the mirror frame 3 between the fixed state and the unfastened state. With no tools, the mirror frame assembly 200 of this disclosure may be mounted to or detached from the vehicle rearview mirror 9. The mirror frame assembly 200 of the disclosure is convenient to use and easy to be assembled, so the object of this disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A mirror frame assembly (200) adapted to be mounted to a vehicle rearview mirror (9), said vehicle rearview mirror (9) including an outer casing (91) and a mirror (92) that is fixed in said outer casing (91), said outer casing (91) having an end edge (911), said mirror frame assembly (200) comprising:
a mirror frame (3) adapted to be removably mounted to said outer casing (91) of said vehicle rearview mirror (9), and including at least one engaging member (311) for engaging said outer casing (91) of said vehicle rearview mirror (9), and a pivot connecting portion (322); and
a removable mounting plate (4) connected removably to said pivot connecting portion (322) of said mirror frame (3) and adapted to be engaged with said outer casing (91) of said vehicle rearview mirror (9), said removable mounting plate (4) having a pivot portion (412) that is connected pivotally to said pivot connecting portion (322), and an engaging portion (423) that is configured to engage said outer casing (91) of said vehicle rearview mirror (9), said removable mounting plate (4) being pivotable relative to said mirror frame (3) between a fixed state and an unfastened state, in the fixed state, said engaging portion (423) engaging said end edge (911) of said outer casing (91), in the unfastened state, said engaging portion (423) being distal from said end edge (911) of said outer casing (91), and said removable mounting plate (4) being rotatable relative to said mirror frame (3).

2. The mirror frame assembly (200) as claimed in claim 1, wherein said removable mounting plate (4) includes a first plate body (41) and a second plate body (42) that extends from said first plate body (41) in a top-bottom direction (Z), said first plate body (41) being formed with said pivot portion (412), said second plate body (42) being formed with said engaging portion (423), said mirror frame (3) including a first wall (31), a second wall (32) that is opposite to said first wall (31) in the top-bottom direction (Z), and a sidewall (33) that interconnects said first wall (31) and said second wall (32), said second wall (32) having an recess (321), said pivot connecting portion (322) being formed in said second wall (32) and being adjacent to said recess (321).

3. The mirror frame assembly (200) as claimed in claim 2, wherein said second plate body (42) further has a connection portion (421) that is connected to said first plate body (41), and a pulling portion (422) that extends from one end of said connection portion (421) in a direction away from said mirror frame (3).

4. The mirror frame assembly (200) as claimed in claim 3, wherein said engaging portion (423) is connected said pulling portion (422) and said connection portion (421) and extends toward said pivot portion (412).

5. The mirror frame assembly (200) as claimed in claim 2, wherein said sidewall (33) has a light-transmitting portion (331).

6. The mirror frame assembly (200) as claimed in claim 1, wherein said pivot connecting portion (322) of said mirror frame (3) includes a plurality of hook members (324) that are spaced apart from each other in a left-right direction (X), said pivot portion (412) of said removable mounting plate (4) including a pivot rod (414) that extends in the left-right direction (X) and that permits said hook members (324) to be pivoted thereto.

7. The mirror frame assembly (200) as claimed in claim 6, wherein said pivot portion (412) of said removable mounting plate (4) further includes a plurality of notches (413) that are spaced apart from each other in the left-right direction (X) and that permit said hook members (324) to respectively extend therethrough, said pivot rod (414) being connected to opening sides of said notches (413) and extending in the left-right direction (X).

8. The mirror frame assembly (200) as claimed in claim 1, wherein said mirror frame (3) further includes at least one rib (323) that is proximate to said pivot connecting portion (322), said rib (323) and said pivot connecting portion (322) cooperating to define a constraining passage (320) therebetween that is expandable, when said removable mounting plate (4) is to be mounted to said pivot connecting portion (322) of said mirror frame (3), said pivot portion (412) first expands said constraining passage (320) and is then pivotally connected to said pivot connecting portion (322).

9. A towing mirror adapted to be mounted at a vehicle rearview mirror (9), said towing mirror comprising:
said mirror frame assembly (200) as claimed in claim 1, and an auxiliary mirror (1) mounted to said mirror frame (3) of said mirror frame assembly (200) and being adjacent to said vehicle rearview mirror (9).

\* \* \* \* \*